A. BEVACQUA.
COMBINATION PLUMB AND LEVEL.
APPLICATION FILED JUNE 4, 1915.
1,162,018.
Patented Nov. 30, 1915.
2 SHEETS—SHEET 2.
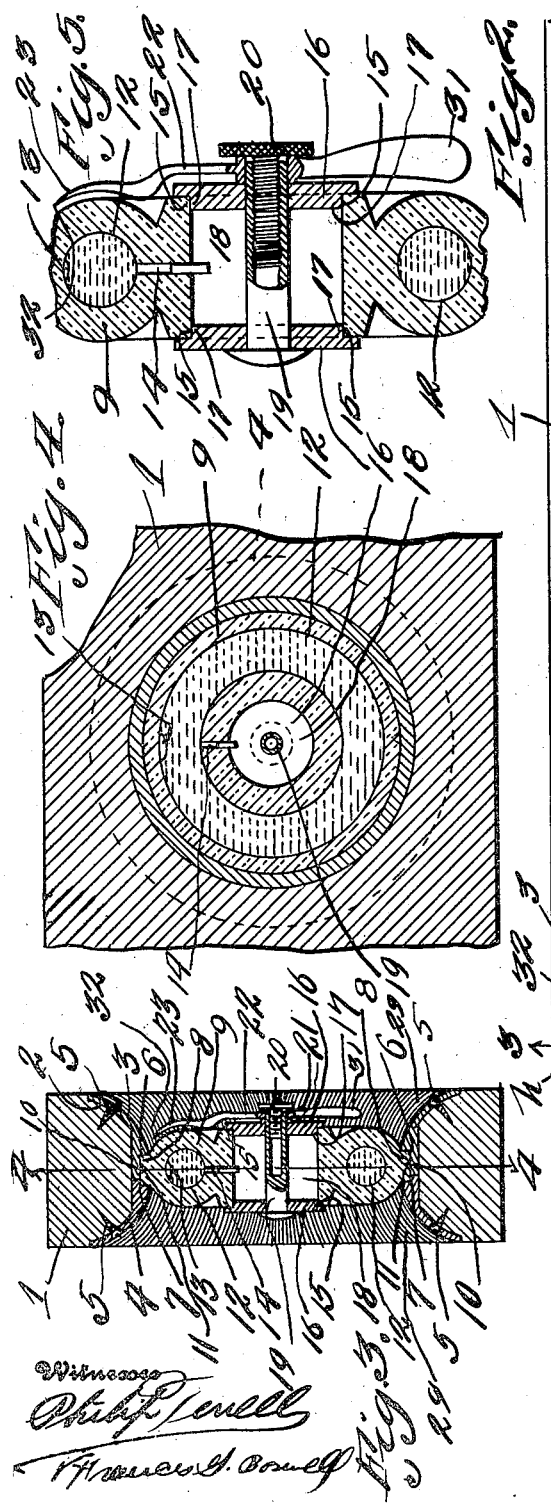
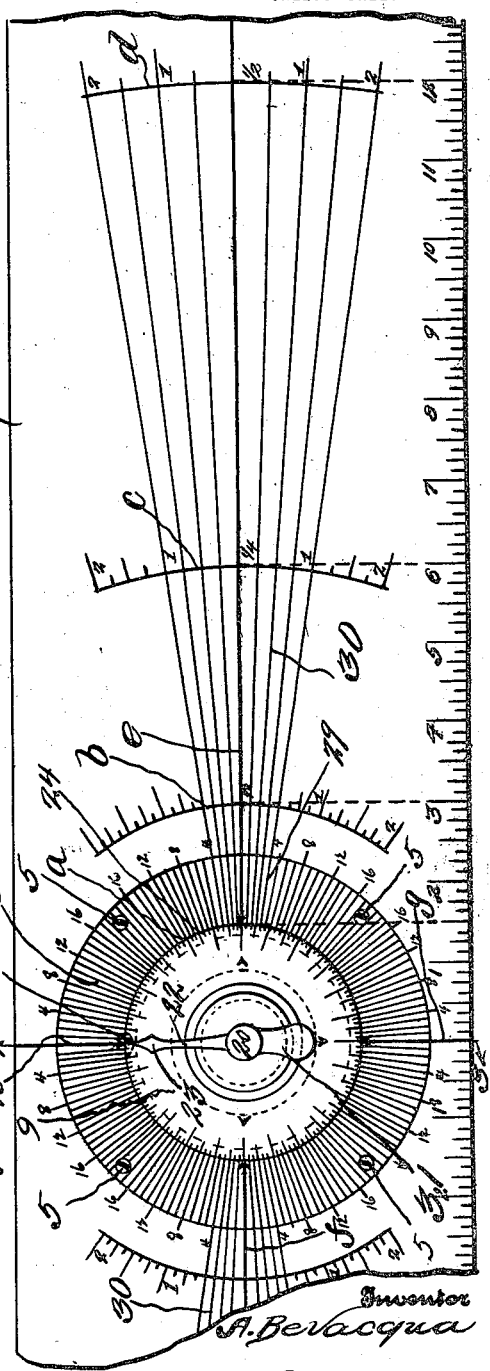

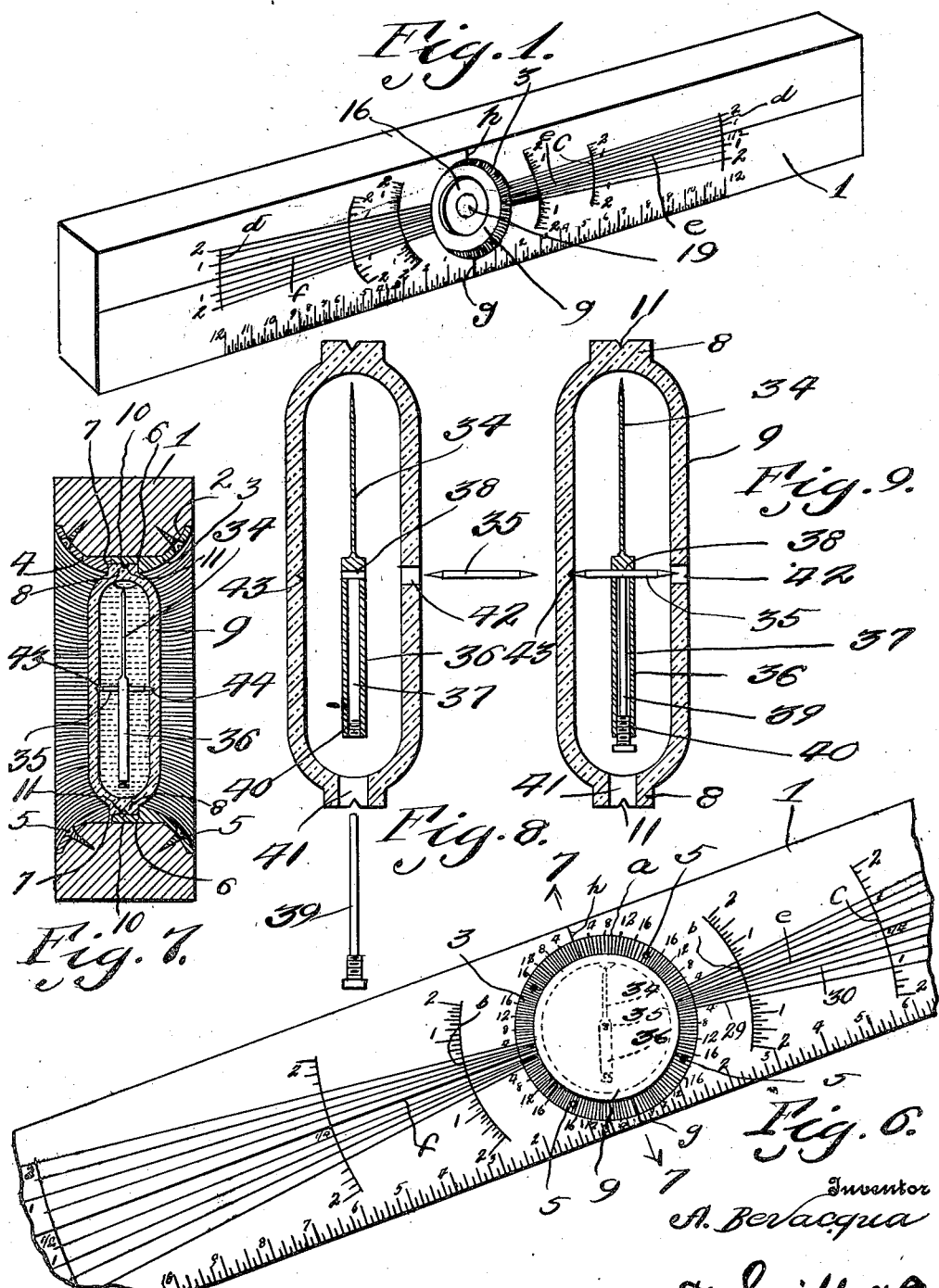

UNITED STATES PATENT OFFICE.

ALESSANDRO BEVACQUA, OF DES MOINES, NEW MEXICO.

COMBINATION PLUMB AND LEVEL.

1,162,018.  Specification of Letters Patent.  Patented Nov. 30, 1915.

Application filed June 4, 1915. Serial No. 32,105.

*To all whom it may concern:*

Be it known that I, ALESSANDRO BEVACQUA, a citizen of the United States, residing at Des Moines, in the county of Union and State of New Mexico, have invented a new and useful Combination Plumb and Level; and I do hereby declare the following to be a full, clear, and exact description of the invention, such as will enable others skilled in the art to which it appertains to make and use the same.

This invention relates to an improved combination plumb and lever, or a geometrical instrument, and an object of the invention is to provide a device of this nature, which is simple and efficient in construction, and may be used by different mechanics, engineers and the like, as well as by the engineer corps of various military services. This instrument or spirit level is particularly adapted for ascertaining where various objects are out of plumb, so that such a defect can be easily and quickly corrected.

In many of the ordinary levels and plumbs, even the better class, the spirit level proper is displaceable with regard to the beam.

Therefore another object of the invention is to provide an immovable or fixed spirit glass, so that in use the instrument is always accurate. Furthermore, the spirit level glass remains stable either in wet or dry weather, or during the changes of seasons and inclement weather, and with good care may be kept in the best of condition for a considerable length of time.

A further object is the provision of a beam having an annular spirit level glass circular in cross section substantially, carried substantially midway between the ends of the beam, and provided with an indicator pivoted concentrically with the glass, and designed to coöperate with various graduations on the glass, and on the beam, so as to indicate where any particular horizontal or perpendicular object is out of plumb, at various distances from where the object is attached. In the use of the device, for instance on a horizontal object, the beam is placed thereon, and wherever the air bubble centers, the indicator is set in registration with the graduation which passes centrally through the air bubble, thereby indicating accurately how much the object is out of plumb. After the indicator is so set, the device may be easily handled without displacing the position of the indicator.

In practical fields the details of construction may necessitate alterations, falling within the scope of what is claimed.

The invention comprises further features and combination of parts, as hereinafter set forth, shown in the drawings and claimed.

In the drawings:—Figure 1 is a view in perspective of the improved combination plumb and level constructed in accordance with the invention. Fig. 2 is an enlarged detail view in elevation showing parts broken away, indicating the spirit glass and the indicator and various graduations, with which the indicator coöperates. Fig. 3 is a sectional view on line 3—3 of Fig. 2, showing the mounting of the spirit glass and the indicator. Fig. 4 is a sectional view on line 4—4 of Fig. 3. Fig. 5 is an enlarged detail sectional view showing how the indicator is carried by the spirit glass. Fig. 6 is a view in side elevation of another form of combination plumb and level, illustrating the indicator mounted in bearings on the interior of the spirit level glass and substantially floating in the fluid of the glass. Fig. 7 is a sectional view on line 7—7 of Fig. 6. Fig. 8 is an enlarged sectional view of the spirit level glass, showing the first step in mounting the indicator on the interior thereof. Fig. 9 is an enlarged detail sectional view of the spirit level glass showing the second step for mounting the indicator on the interior of the glass, subsequently to which the openings of the glass may be sealed.

Referring more especially to the drawings, 1 designates the beam of the level, which may be of any desired length or proportion. Instead of being elongated or of a certain length as shown, the beam may be in the form of a square or block. This beam or block is provided with a central annular opening, the wall of which opening 2 is substantially convexed as shown, and secured to opposite sides of the wall are partially curved plate rings 3 and 4, by means of screws 5. The adjacent edge portions of these plates are recessed or rabbeted as shown at 6 and 7, which receive the annular extension flange 8 of the spirit level glass 9, thereby holding the spirit level glass concentrically in the opening of the beam, and substantially midway between the opposite faces of the beam. One of the rabbeted portions of one of the plates has an annular tongue 10 to enter correspondingly shaped annular groove 11 in the extension annular flange 8, thereby affording additional means for holding the spirit level glass against displacement and immovable. It will be seen that the spirit level glass is of an annular tubular contour, the hollow portion thereof is indicated at 12 being designed to carry the usual spirit leveling fluid, for instance, a combination of glycerin and alcohol, there being the usual air bubble 13. This fluid may be projected into the tubular spirit level glass in any suitable manner. For instance, in constructing the glass a small hole or orifice may be formed in any part of the wall of the glass, the fluid inserted therethrough, after which the orifice, as indicate at 14 may be sealed in any suitable manner. Engaging the opposite annular corner edges 15 of the opening of the glass are annular plates or disks 16, the shoulders 17 extending partially into the central opening 18 of the tubular annular glass. Extending concentrically through one of the plates or disks 16 is a hollow screw 19, which also passes through the other plate or disk 16 partially, and telescopically threaded in the hollow end of the screw 19 is a headed thumb screw 20. Pivotally mounted upon the hollow portion of the screw 19 and between the adjacent faces of the washers 21 is an indicator 22, which may be clamped or held in adjusted position relative to the graduations upon the plates 3 and 4, by tightening the screw 20. The end portion 23 of the indicator is curved, to conform to the curvature of the spirit level glass. Either outer face of the spirit level glass is provided with any scale or form of graduations 24, whereas either of the plates 3 and 4 is provided with corresponding graduations. One of the longitudinal edges of the beam is provided with graduations arranged in the scale of inches, which are divided and subdivided into half inches, quarter inches, eights of an inch and sixteenths of an inch and the like, so that the radial lines of graduations 29 on either of the plates 3 and 4 (at the annular line of demarkation $a$, one and one half inches from the center of the spirit level glass) will be spaced substantially one sixteenth of an inch apart, thereby indicating (when using the instrument as a plumb) that the object, beam or standard is off plumb one sixteenth of an inch to one and one half inches; or upon the radial lines of graduation 30 of the level beam, the object or the like is off plumb one eight of an inch to a three inch radius as indicated at $b$; or off plumb a quarter of an inch to six inches radius as indicated at $c$; or off plumb a half an inch to twelve inches or a foot radius indicated at $d$.

The heavy radial lines $e$, $f$, $g$, and $h$ extend directly at right angles to each other. The lower portion of the indicator is weighted as shown at 31, so that when the screw 20 is loosened, the indicator will balance substantially vertical, and the extremity 32 of the indicator will coincide with the center of the air bubble of the spirit level glass regardless of the position of the level beam. If it is desired to dispose a beam or the like on an angle or a pitch from a horizontal plane at a half inch to a foot, the beam or the object to be so disposed with the instrument thereon is lowered at one end, the point 32 of the indicator always coinciding with the center of the air bubble, and until the point 22 of the indicator registers with the proper radial graduation to the left or the right of the line $h$, subsequently to which the beam or object may be secured in such position. If the pitch of the beam is to be increased, it may be lowered farther, until the pointer at 32 will coincide with the proper graduation to the left or the right of the line $h$ indicating the desired pitch. In lowering the left hand end of the beam or object on a horizontal plane, the point or indicator works to the right of the line $h$, to indicate the necessary pitch. However, as before stated, the indicator may be clamped in position indicating the proper pitch on the graduations of the glass and either of the plates 3 and 4, to the right or the left of the line $h$, or to the left or the right of the line $e$, or the line $f$ when the instrument is disposed vertically, and the object or beam is tilted, until the center of the air bubble coincides with the extremity 32 of the indicator.

In Figs. 6, 7, 8 and 9 the spirit level glass in cross section is elongated, and the indicator 34 is pivotally mounted by virtue of the pin 35 on the interior of the glass, so as to substantially float in the fluid therein, so that no matter as to what position the air bubble may assume, the extremity of the indicator will coincide substantially with the center of the air bubble. In order that the indicator will balance in this manner, incident to the position of the air bubble, the same is weighted at 36 at its lower portion, and is hollow as indicated at 37. The indicator 34 has an opening 38, through which the pivot pin 35 extends, there being a key pin 39 extending through the hollow portion of the indicator, to bear against the pivot pin 35, to lock the indicator thereon. The key pin 39 is threaded at 40 into the lower end of the hollow portion of the indicator. In order to insert the pivot pin 35 through the opening 38 of the indicator (which is inserted into the spirit level glass through the opening 41) one side of the glass is constructed with an opening 42. After the pivot pin 35 is inserted through the opening 42 so that one end of the pin 35 will seat in the conical depression 43, and the indicator 34 is secured on the pin 35, the opening 42 is closed or sealed, so that the other end of the pivot pin will seat in a conical bearing as indicated at 44, Fig. 7. After the indicator 34 has been so mounted, and the opening 42 sealed or closed, the level glass is filled with the necessary fluid, through the opening 41, after which the opening 41 is closed or sealed, to prevent the escape of the fluid.

The invention having been set forth, what is claimed as new and useful is:—

1. A spirit level comprising a beam having an opening therein, a spirit level glass in the opening and being annular so that the air bubble will move annularly about the circumference of the glass in either direction, clamping plates upon opposite sides of the glass for holding the glass in position, and a fulcrumed weighted indicator carried by the glass to coincide with the air bubble of the spirit glass.

2. A spirit level comprising a beam having a central opening, a circular spirit glass clamped in said opening and provided with graduations upon either face thereof, and a weighted indicator fulcrumed concentrically with the spirit glass to coöperate with said graduations, said beam having graduations radiating from the center of the glass, arc graduated lines intersecting the radial graduations at varied distances from the center of the glass, and a scale of inches adjacent one edge of the level beam for indicating the distances at which the arc lines intersect the radial graduations of the beam.

3. A spirit level comprising a beam having a central opening, the opposite walls of the opening being curved, a spirit glass in said opening, clamping rings engaging and being secured to the curved walls of the opening and having their adjacent portions provided with annular recesses or rabbets, the glass having an annular flange engaging said annular recesses or rabbets to hold the glass in position, said glass having a central opening, plates arranged adjacent the opposite faces of the glass and having parts telescoping the central opening of the glass, a hollow screw passing through said plates of the glass, a balancing indicator fulcrumed upon the hollow screw, and means carried by the hollow screw to prevent displacement of the indicator, and graduations on one face of the glass with which the indicator coöperates.

In testimony whereof I have signed my name to this specification in the presence of two subscribing witnesses.

ALESSANDRO BEVACQUA.

Witnesses:
 ROBERT A. BOSWELL,
 PHILIP A. H. SENELL.